United States Patent
Shachar et al.

(10) Patent No.: US 10,758,807 B2
(45) Date of Patent: *Sep. 1, 2020

(54) SMART COURT SYSTEM

(71) Applicant: PLAYSIGHT INTERACTIVE LTD., Kfar Saba (IL)

(72) Inventors: Chen Shachar, Kohav Yair (IL); Evgeni Khazanov, Petah Tikva (IL); Yoram Ben Zur, Tzur Yigal (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,524

(22) Filed: Dec. 13, 2019

(65) Prior Publication Data

US 2020/0114240 A1    Apr. 16, 2020

Related U.S. Application Data

(63) Continuation of application No. 14/320,364, filed on Jun. 30, 2014, now Pat. No. 10,518,160, which is a
(Continued)

(51) Int. Cl.
*G06T 7/20* (2017.01)
*A63B 71/02* (2006.01)
(Continued)

(52) U.S. Cl.
CPC .......... *A63B 71/02* (2013.01); *A63B 71/04* (2013.01); *G06K 9/00724* (2013.01); *G06T 7/20* (2013.01); *G06T 7/292* (2017.01); *A63B 2225/50* (2013.01)

(58) Field of Classification Search
CPC ................. G06Q 30/02; G06T 7/20
(Continued)

(56) References Cited

U.S. PATENT DOCUMENTS 5,574,845 A    11/1996  Benson et al.
6,877,010 B2   4/2005   Smith-Semedo et al.
(Continued)

FOREIGN PATENT DOCUMENTS

WO      02061684 A2    8/2002
WO   2006111928 A2    10/2006
(Continued)

OTHER PUBLICATIONS

Ahanger and Utile, A Survey of Technologies for Parsing and Indexing Digital Video. MCL Technical Report., Boston University, Nov. 1, 1995 :1-35.
(Continued)

*Primary Examiner* — Omkar A Deodhar
*Assistant Examiner* — Ross A Williams
(74) *Attorney, Agent, or Firm* — Acuity Law Group, PC; Michael A. Whittaker

(57)  ABSTRACT

A Smart-court system, adaptive to constrained sport environment, for enabling real time analysis and debriefing of sport activities is provided herein. The Smart-court system is comprised of: (i) an automatic recording system comprising a plurality of video cameras located in a court, arranged to real-time (RT) recording of a sport session and utilizing automatic calibration and stabilization module; and (ii) a data processing system comprising: (a) a capture module for grabbing a video stream; (b) an objects' detector module arranged to extract during the RT sport session, the objects from the foreground of each frame; (c) an event module for automatically analyzing, the motion and the activities of the tracked objects for automatically identifying and classifying events, creating a synchronized event log and calculating statistics that occurred during the RT sport session; and (d) a presentation module enabling to perform instant debrief-
(Continued)

ing, combined biomechanical and tactical analysis of the video.

20 Claims, 8 Drawing Sheets

Related U.S. Application Data continuation-in-part of application No. PCT/IL2013/050162, filed on Feb. 21, 2013.

(60) Provisional application No. 61/602,360, filed on Feb. 23, 2012.

(51) Int. Cl.
    *G06T 7/292*     (2017.01)
    *G06K 9/00*     (2006.01)
    *A63B 71/04*     (2006.01)

(58) Field of Classification Search
    USPC .................. 463/1–6, 30–33, 40–42
    See application file for complete search history.

(56) References Cited

U.S. PATENT DOCUMENTS

| | | |
|---|---|---|
| 7,756,876 B2 | 7/2010 | Smith-Semedo et al. |
| 8,060,515 B2 | 11/2011 | Smith-Semedo et al. |
| 8,566,315 B1 | 10/2013 | Davtchev et al. |
| 9,087,297 B1 | 7/2015 | Filippova et al. |
| 10,518,160 B2 | 12/2019 | Shachar et al. |
| 2002/0115047 A1 | 8/2002 | McNitt et al. |
| 2003/0147466 A1 | 8/2003 | Liang |
| 2006/0166737 A1 | 7/2006 | Bentley |
| 2007/0157226 A1 | 7/2007 | Misra |
| 2008/0005231 A1 | 1/2008 | Kelley et al. |
| 2008/0100731 A1 | 5/2008 | Moscovitch |
| 2008/0192116 A1 | 8/2008 | Tamir et al. |
| 2008/0214903 A1 | 9/2008 | Orbach |
| 2009/0128628 A1 | 5/2009 | Reinitz et al. |
| 2010/0026809 A1 | 2/2010 | Curry |
| 2010/0114671 A1 | 5/2010 | Bobbitt |
| 2010/0191689 A1 | 7/2010 | Cortes et al. |
| 2011/0173249 A1 | 7/2011 | Lee et al. |
| 2011/0199372 A1 | 8/2011 | Porter et al. |
| 2011/0263946 A1 | 10/2011 | el Kaliouby et al. |
| 2011/0276396 A1 | 11/2011 | Rathod |
| 2012/0041956 A1 | 2/2012 | Smith-Semedo et al. |
| 2013/0250115 A1 | 9/2013 | Fan et al. |
| 2014/0315610 A1 | 10/2014 | Shachar et al. |
| 2015/0208000 A1 | 7/2015 | Ojanpera |

FOREIGN PATENT DOCUMENTS

| | | |
|---|---|---|
| WO | 2007006083 A1 | 1/2007 |
| WO | 2007099502 A2 | 9/2007 |

OTHER PUBLICATIONS

Almajai et al., Ball Event Recognition using HMM for Automatic Tennis Annotation. Paper from CVSSP, University of Surrey, Guildford GU2 7XH, UK, presented at Proceedings of the 2010 IEEE 17th International Conference on Image Processing, Hong Kong, 2010 (4 pages).

International Search Report issued in PCT/IL2013/050162 dated Jun. 26, 2013.

Preliminary Report on Patentability issued in PCT/IL2013/050162 dated Aug. 26, 2014.

Etievent et al., Assisted video sequences indexing: shot detection and motion analysis based on interest points. Labo. Reconnaissance de Formes et Vision, Insa Lyon, INSA. 1999:1-10.

Flinchbaugh et al., Robust Video Motion Detection and Event Recognition: DARPA Image Understanding Program. Texas Instruments Inc. 1996:1-4.

Ivanov et al., Video Surveillance of Interactions. paper for MIT media Lab., MIT Artificial Intelligence Lab., Feb. 1999:1-8.

Kersten et al., A Feature Database for Multimedia Objects. CWI Amsterdam, 1998:9 pages.

Kokaram et al., Browsing Sports Video—Trends in sports-related indexing and retrieval work. IEEE Signal Processing Magazine, Mar. 2006:47-58.

Lecture slides prepared by Donato Campagnoli, published on server on Apr. 22, 2014, 111 pages.

Noldus, Virtual Observer offers new possibilities for ergonomics research and skills training. Apr. 21, 1998. https://www.rioldus_com/news/virtual-observer-offers-new-possibilities-ergonomics-research-and-skills-training_ Apr. 21, 1998 :1-4.

Terroba et al., Tactical Analysis Modeling through Data Mining—Pattern Discovery in Racket Sports. Proceedings of the International Conference on Knowledge Discovery and Information Retrieval, The University of Leiden, The Netherlands, 2010:6 pages.

Thiel et al., Can Rule-Based Indexing Support Concept-Based Multimedia Retrieval in Digital Libraries? Some Experimental Results. German National Research Center for Information Technology, IPSI, D-64293 Darmstadt, Germany, Apr. 1999: 1-11.

Wang et al., Content-based image indexing and searching using Daubechies' wavelets. Int J Digit Libr 1997; 1:311-328.

Zhu et al., Player Action Recognition in Broadcast Tennis Video with Applications to Semantic Analysis of Sports Games Proceedings of the 14th ACM international conference on Multimedia, 2006:431-440.

Zhu et al., Trajectory Based Event Tactics Analysis of Broadcast Sports Video. Proceedings of the 15th ACM International Conference on Multimedia, 2007 (10 pages).

SMART COURT SYSTEM

CROSS-REFERENCE TO RELATED APPLICATIONS

This application is a continuation of U.S. patent application Ser. No. 14/320,364, filed Jun. 30, 2014, which is a continuation-in-part of International Patent Application No. PCT/IL2013/050162, filed Feb. 21, 2013, which designated the United States and claims the benefit of priority to U.S. Provisional Application No. 61/602,360 filed Feb. 23, 2012, the entire contents of which are incorporated herein for all purposes.

FIELD AND BACKGROUND OF THE INVENTION

The present invention relates generally to analysis of motion and activities of an object that is involved in a real sport game. More particularly, the present invention relates to classification and analysis of real sport game session video.

Participants of real sport games as well as coaches are in an ongoing effort to improve the activity and capability of the participants in the sport games. For that purpose, various video analysis systems exist in the art.

Some of the analysis systems that exist in the market require from participants of the real sport games to be equipped with an electronic sensing device. Also, some of the analysis systems use a large array of cameras, which require a dedicated operator and a long setup and calibration process.

Video analysis systems that currently exist in the market require a long preparation period before the video analysis can take place. For example, such a preparation process may include manual recording, calibration procedure and uploading of footage. With these systems, a user has to watch and analyze videos and manually tags various events (say a serve or a break point) of the training or match sessions, since such events that are of interest to participants and coaches are not grouped together.

SUMMARY OF THE INVENTION

According to some embodiments of the present invention, a Smart-court system, adaptive to a constrained sport environment, for enabling real time analysis and debriefing of sport activities is provided herein. The Smart-court system is comprised of: (i) an automatic recording system comprising a plurality of video cameras that are located in a court, arranged to real-time (RT) recording of a sport session and utilizing an automatic calibration and stabilization module requiring no human intervention; and (ii) a data processing system that is comprised of: (a) a capture module for grabbing a video stream of the RT sport session; (b) an objects' detector module that is arranged to receive a stream of video of the tracked objects and extract, during the RT sport session, the objects from the foreground of each frame; (c) an event module for automatically analyzing, during the RT sport game, the motion and the activities of the tracked objects that appear in the stream of multimedia data for automatically identifying and classifying events based on the tracking and analysis of the motion and the activities of the tracked objects, creating a synchronized event log and calculating statistics that occurred during the RT sport session; and (d) a presentation module enabling to perform instant debriefing, combined biomechanical and tactical analysis of the video by selectively playing specific events by type based on the synchronized event log.

According to some embodiments of the present invention, the smart court system is further comprising a tracking module for identifying in real time basic events enabling to identify a game session starting with a stroke and ending when one of the players gained a score, wherein the event module enables to identify complex events in near real time at the end of each session during the game match.

According to some embodiments of the present invention, the online video associated with event log is uploaded and published in one or more social networks.

According to some embodiments of the present invention, the event module is further arranged to yield a pattern of behavior and a tactical behavior of a player from more than one event.

According to some embodiments of the present invention, the data processing system further generates a profile of the player including information related to: the player's tactical behavior, the pattern of behavior, game statistics, calculated success rate in comparison with other players and events.

According to some embodiments of the present invention, automatic camera calibration is enabled by dividing a court, as captured by the camera, into a grid and checking each junction in the grid for a deviation and wherein the deviation is identified in the grid than the frame in the streamed video may be checked in the streamed video.

According to some embodiments of the present invention, the data processing system identifies a start and an end of a real sport game or real training session and automatically identifies a change of status of the real sport game (say an and of set in a Tennis Game).

According to some embodiments of the present invention, the video that is transmitted from the cameras is automatically customized to adjust to environment conditions and does not require an intervention of an operator.

According to some embodiments of the present invention, vibration in the stream of video is automatically reduced, using known in the art techniques According to some embodiments of the present invention, the data processing module further enables to create automatic customized video movie by integrating event or segments according to given criteria which are determined by the user or predefined by the system.

According to some embodiments of the present invention, change of designated location of players is identified when the players switch sides on the court.

According to some embodiments of the present invention, an additional techniques and strategies module provides recommendations to a player how to correct activity in a real sport game based on events' analysis, say using a catalogue of recommendations input by experts in the field, and classified according to specific event types.

According to some embodiments of the present invention, events' analysis and pattern behavior enable cutting out idle time between events, from the video file.

According to some embodiments of the present invention, the presentation module enable playing abridged video which displays only selected specified events by jumping between the events according to user query based on the synchronized log event.

According to some embodiments of the present invention, the presentation module enables playing a virtual 3D dynamic scenes using a 3D engine which simulates objects behavior based on analyzed video data of objects motion and an automatically synchronized event log, as described in further detail hereinbelow.

According to some embodiments of the present invention, the pattern behavior of the player is further analyzed to identify mental events.

According to some embodiments of the present invention, a method for enabling real time analysis and debriefing of sport activities in a Smart-court system that is adaptive to a constrained sport environment is provided herein. The method is comprised of the following stages: (i) automatically recording in real time (RT) a real sport session by utilizing an automatic calibration and stabilization module requiring no human intervention by a system that is comprising a plurality of video cameras that are located in a court; (ii) tracking motion and the activities of objects in a video of the RT sport session by a tracking module; (iii) receiving a stream of video of the tracked objects and simultaneously analyzing, during the RT sport session, the motion and the activities of the tracked objects that appear in the stream of video; (iv) automatically identifying and classifying events based on the tracking and analysis of the motion and the activities of the tracked objects and calculating statistics that occurred during the RT sport session; and (v) creating a synchronized event log of the classified events, wherein a user is enabled to perform instant debriefing, combined biomechanical and tactical analysis of the video by selectively playing specific events by type based on the synchronized event log.

According to some embodiments of the present invention, basic events such a first serve, a second serve, etc., are identified in real time, say for identifying a game session starting with a stroke and ending when one of the players gains a score, wherein complex events such as a double fault, are identified near real time at end of each session during the game match, as described in further detail hereinbelow.

According to some embodiments of the present invention, the method is further plays an abridged video by jumping between different events based on a user query according to the synchronized event log, say a query limiting the abridged video to serve events.

According to some embodiments of the present invention, the method further includes publishing and uploading of game statistics, the online video and associated events recorded in the event log synchronized with the video, on one or more social networks.

According to some embodiments of the present invention, the method further yields a pattern of behavior and a tactical behavior of a player from more than one event by the analysis module, as described in further detail hereinbelow.

According to some embodiments of the present invention, the method further generates and uploads to the network, a profile of the player and saves information related to: the player's tactical behavior, pattern of behavior, performance statistics and events, by the data processing system of the presented examples.

According to some embodiments of the present invention, the method further identifies a start and end of a real sport game or real training session and automatically identifies a change of status of the real sport game by the system of the presented examples.

According to some embodiments of the present invention, the method further automatically customizes the video that is transmitted from the cameras, so as to adjust the video to environment conditions and does not require an intervention of an operator.

According to some embodiments of the present invention, the method further automatically reduces vibration in the stream of video, say using known in the art techniques.

According to some embodiments of the present invention, the method further identifies a change of status by a predefined gesture of the user, say using gesture recognition techniques, as known in the art.

According to some embodiments of the present invention, the method further identifies a change of designated location of players, when the players switch sides on the court.

According to some embodiments of the present invention, the method further provides recommendations to a player on a way to correct his playing in a real sport game based on events' analysis, say by an additional techniques and strategies module, as described in further detail hereinabove.

According to some embodiments of the present invention, the method further cuts out idle time in the video file, say in order to save storage space by events' analysis and pattern behavior.

According to some embodiments of the present invention, the method further plays an abridged video which includes specified events.

According to some embodiments of the present invention, the method further plays a virtual 3D dynamic scenes based on the videos using 3D engine to simulate objects behavior based analyzed motion data of objects and the synchronized event log.

According to some embodiments of the present invention, the method further analyzes pattern behavior and tactical behavior, so as to identify a mental event of the player, as described in further detail hereinbelow.

According to some embodiments of the present invention, the method further comprises a step of creating a customized video movie by integrating events or segments, according to given criteria which are determined by the user or predefined by the system.

According to some embodiments of the present invention, the method further comprises a step of identifying an unforced error, say based on identifying the timing and position of the player before striking the ball.

According to some embodiments of the present invention, the method further comprises a step of real time automatic calculation of game score based on identified classified events and analysis of player and ball position and motion.

According to some embodiments of the present invention, the method further comprises a step of comparing between the players' profiles and providing performance matching between players.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DESCRIPTION OF EXEMPLARY EMBODIMENTS

Figure 1A:
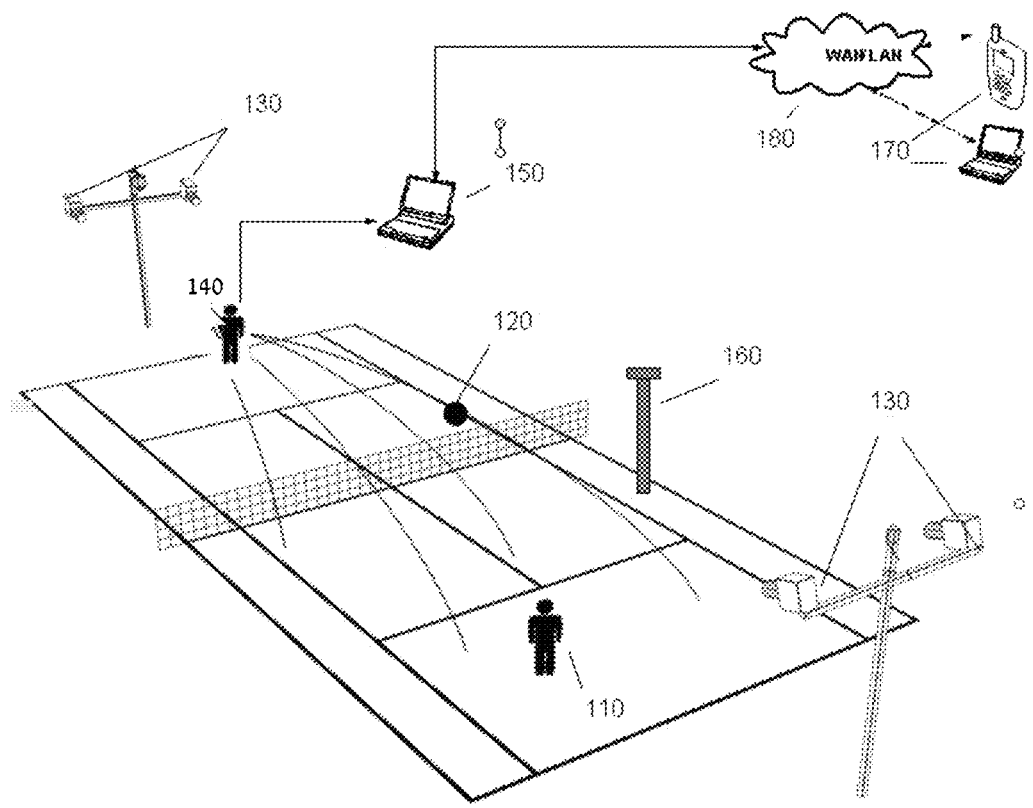
FIG. 1A is a top 3D perspective diagram of a system incorporated in a Tennis court, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "event" as used herein in this application is defined as an at least one action (say a first serve of a ball in Tennis) which occur during a real sport game as captured in video (say a in video or multimedia file) by cameras positioned around the court, as described in further detail hereinbelow. Once a system according to present embodiments identifies the event, a title identifying the event, together with indications on the beginning and end of the event (say time based indications, or indications on relative position within the video, as known in the art) are recorded in an event log file, thus synchronizing the event log with the video. Optionally and additionally, various parameters related to the event—such as a speed of the ball, a maximal height of the ball (as measured along the ball's trajectory following that serve, till the ball hits the court, the court's net, or an area out of the court's boundaries), etc., are also recorded in the log event file, as described in further detail hereinbelow.

The term "classification of event" as used herein in this application is defined as an attribution of an event to a predefined type of sequence of actions that occur in a real sport game. The classification of the event is a result of an analysis of the event and it is saved in the event log, as described in further detail hereinbelow.

The term "tactical behavior" as used herein in this application is defined as a result of analysis of a pattern of behavior of a player according to more than one event—say by identifying a 'double fault' event when the player errs twice, say in two serve events, as described in further detail hereinbelow. The pattern of behavior may be classified according to a predefined list of tactical behavior types and the classification of the tactical behavior is saved in the database along with the players' profile and other details of the real sport game.

The term "profile" as used herein in this application is defined as a collection of parameters which are related to a real player, say to Novak Djokovic.

The term "T Point" as used herein in this application is defined as the spot on a tennis court where the center line and the service line intersect perpendicularly to form a "T" shape.

The term "session" as used herein in this application is defined as a segment of a real sport game, as captured in a video, say a segment which consists of a video sequence which starts in a strike of the ball by a player and ends in earned points.

The term "near real-time" (NRT), as used herein in this application is defined as a delay that is introduced by automated data processing between the occurrence of an event and the use of the processed data. For example, classifying an event as a near real-time event refers to the real time of event occurrence, minus the processing time, as nearly the time of the live event.

According to some embodiments of the present invention, a system for enabling simultaneous analysis and debriefing of a sport activity (say a Tennis match or a Football game) is provided herein. The system may enable a user to track events that occurred during the activity (say a real sport game). Furthermore, the system may provide automatic classification, analysis and understanding of the events of the real sport game (say the Tennis match) or training, say for improving the performance of the player in the real sport game.

According to some embodiments of the present invention, the system may also record and analyze activity and motion of a player (say a Tennis player) and other objects (say a ball or a net) which are related to the real sport game, say using three dimensional analysis of video data captured during the real sport game.

According to some embodiments of the present invention, there is provided a data processing system. The data processing system may be arranged to receive a streams of video of a real time (RT) sport activity (say a Tennis match) from one or more cameras and to simultaneously analyze, during the sport activity, motion and actions of objects that appear in the video stream(s).

According to some exemplary embodiments of the present invention, the system is implemented by utilizing a smart-court platform that is adaptive to a constrained sport environment. Optionally, in the constrained sport environment, there are installed at least two cameras, preferably four cameras, for video capturing and recording of a real sport activity (say a game) which takes place in the constrained sport environment. The constrained sport environment may be a swimming pool, a football field, a tennis court, etc. For the purpose of explaining the present exemplary embodiments, a reference may be made to a tennis game or a tennis training, as a real sport game captured in a video stream, in real time, simultaneously to the game. However, the methods m presented herein below, may also be applied on video steams in which sport activities different than Tennis are captured.

According to some embodiments of the invention, vision and image processing methods executed by modules of a system, according to exemplary embodiments presented and described in further detail hereinbelow, are applied for automatic analysis of events captured in video files of the real sport game.

In one example, the round or oval image of a ball and the round or oval images of players' heads are located in three dimensional (3D) image data obtained through stereoscopic analysis of video streams, captured simultaneous by two or more cameras positioned around a constrained environment. The video streams are captured during a sport activity (say a Tennis game) in real time. Each round or oval image's location is kept tracked of, during the sport activity. Typically, the round or oval image of the ball differs from the round or oval image of each player, in size, shape, or number (one ball as opposed to two or more of players).

In a first example, a basic event such a first serve of a ball, by a first player, in a beginning of a Tennis play, is automatically identified based on a slow closing of distance between a round image of first player and a round image of the ball (say into a predefined small distance) as learnt from analysis of the 3D image data, followed by an onset of rapid movement of the round image of the ball up and away from the round image of the first player's head. Then, the round image progresses in a nearly parabolic trajectory and collides with an image of the net dividing the court, which collision marks the end of that first serve event, in what is known as a 'net' status.

Consequently, a first serve event with the details of start time of the serve (say the time of that onset of movement away from the first player), and an end time of the serve (say the time in which the ball hits the net), and a 'net' status is automatically recorded in an event log, which event log is thus synchronized with a video of the match, in real time or in near real time.

In the example, the first player's second serve (i.e. a second attempt at scoring), which ends in the ball's landing out of the court boundaries, is similarly identified and recorded, as a second serve event with the details of start time of the second serve (say a time of onset of movement away from the first player, in the second time), and an end time of the serve (say the time in which the ball lands out of the court), and an 'out' status is recorded the an event log, thus continuing the automatic synchronization of the event log, in real time or near real time.

However, the cascade of the two serve events may be automatically interpreted as a complex event (i.e. an event resultant upon occurrence of a chronological sequence of two or more events, as predefined by an official Tennis rule or by another rule input to the system). In the specific example, upon the ending of the second serve with an 'out' status (i.e. when the ball hits an area out of the court's boundaries and the first player thus fails to score, for the second time), a third event, namely—a 'double fault' event is similarly recorded in the synchronized event log, with a start time, end time, and additional details (such as player, match number, etc.).

In a second example, following the first serve by the first player, rather than colliding with the net, the ball hits the second player's side and bounces, which bouncing marks the end of the first serve in an 'in' status. Within one or two seconds, the first serve is automatically recorded in the event log, as a serve event with the details of the start time of the first serve (i.e. the time of onset of movement away from the first player), and an end time of the serve (i.e. the time in which the ball lands and bounces in the court), and an 'in' status. However, after the ball bounces, as the first player runs to the net, the second player hits the ball with a forehand (or a backhand) stroke, and the first player hits the ball again in a volley (i.e. in a shot where the ball is struck without allowing the ball to bounce) and the ball lands at the second party's side. Consequently, a basic event of a forehand (or a backhand) stroke, a basic event of a volley stroke, and a complex event of serve-volley pattern are also recorded on the event log, with their respective start and end times, type (say 'forehand'), player id, etc.

Optionally, points scored for a basic or complex event are automatically calculated using game rules, and recorded in the events log, together with the basic or complex event.

Consequently, a video stream captured by one (or more) of the cameras during the Tennis match, may be presented on a computer screen, to a viewer, say a coach or a fan, side by side with a list of some or all of the events recorded in the event log during the match, in sync with the video. In one example, the system automatically and synchronically moves an arrow symbol among the events in the list presented to the viewer, as the match progresses in the video. Optionally, the user is allowed to select among the events, say by jumping from one event to the other (say by manually moving the arrow symbol, or by clicking on one of the events in the presented list), by filtering the event list such that only events associated with a specific player or event type are shown, etc. Consequently, the video shown automatically jumps to (or among) the video's portion(s) in which video of the event(s) thus selected is (are) shown, using the start and end time data of that event, as recorded in the events log, as described in further detail hereinabove.

Optionally, the user may use the event log, to view videos sequences captured during different sport activities, say serves by Novak Djokovic, as video captured in different matches. Consequently, a list of serve events recorded in the event log, during several Novak Djokovic matches are presented to the user, and the user is allowed to skip from one video sequence to the other, by clicking or using his computer's Tab key. Optionally, the event log is implemented as a plurality of event logs, say event logs of different periods, sport fields, competitions, etc., or any combination thereof.

Thus, exemplary embodiments of the present invention may provide a smart-court platform for analyzing patterns of behavior of an object participating in a real sport game and classifying the patterns. The smart-court platform receives video streams of the sport game from two or more cameras located in the place where the real sport game takes place. The system may automatically record and analyze a pattern of tactical behavior and then classify it, as described in further detail hereinbelow.

According to some embodiments of the present invention, the system further provides calculations of game statistics such as: (i) player's and ball's position in various positions; (ii) player's speed; (iii) player's mileage calculation; (iv) player's acceleration; (v) ball's location and spin; (vi) number of winners; (vii) number of double fault; and (viii) serve percentage, speed, position and points on first serve i.e. whether the player won the point after the serve.

Optionally, the game statistics are calculated in real time or in near real time, and are updated in real time or in near real time, throughout the sport game.

According to some embodiments of the present invention, the system automatically classifies events that took place during a match or training, such as: player behavior related events or game rules related events, for example: (a) types and order of strokes, (b) net approach; (c) passing shots; (d) slices; (e) aces, (f) successfully gained points; (g) game types; (h) matches; (i) tactical patterns; (g) forced error; and (h) unforced error, etc., as known in Tennis.

In Tennis, an unforced error has to do with poor performance of a player and may be identified in relation to a player's profile, and/or an analysis of the movement of the ball, taking into consideration factors derived from processing of the video data—such as a ball's direction, a ball's speed, a ball's height, position of a player when the player's opponent strikes the ball, as well as other factors such as the player's age as recorded in a player's profile, the wind direction in the court, etc.

In one example, an error is automatically detected and classified as a forced error or an unforced error, by analyzing a player's position when an opponent hits the ball after being served the ball by the player. In case the player could reach a position where the player can strike the ball—as evident from analysis of the simultaneous video streams (say the positional data of the ball—say speed, height, and/or direction, as predefined in the system)—at least a specified amount of time (say one second) before the ball arrives at that position, but fails to, the system automatically classifies the error as an unforced error. In case the player manages to reach the point within that specified amount of time (e.g. one second), but still fails to strike the ball, a forced error rather than an unforced error, is identified. The identification of a forced vs. an unforced error is thus based on an analysis of position and motion of objects (i.e. players and balls) in relevant frames of the video streams captured by the cameras.

Optionally, the age of the player is also taken into consideration, by the system, for automatically classifying a player's error as an unforced error or as a forced error. For example, when the ball lands at a position within a radius of 0 to 2.5 meters from the player's position which the system records when the opponent strikes the ball (at a certain speed, the system may use a table predefined by an administrator of the system, to determine whether the payer has enough time to hit the ball, according to the speed of the ball and the player's age. Thus, in the example, a failure of a player in his twenties to strike that ball or a player's striking that ended in the ball's hitting the net or landing out of the court, is classified as an unforced error, whereas a failure of a player in his forties to hit that ball (or a strike with the ball landing out of the court or hitting the net) is rather classified as a forced error.

In a another example, when the ball rather hits at a position within a radius of 2.5 to 12 meters from the player's position as recorded by the system when the opponent strikes the ball, the system does not take the player's age into consideration, but does take into consideration a new position which the player runs and positions himself at, after his opponent strikes the ball. After the player strikes the ball, a failure of the player to score due to the ball's hitting the net or landing out of the court, is identified as an unforced error when the system estimates that the player has enough time to prepare to strike the ball from that new position, and as a forced error when the system estimates that the player doesn't have enough time to prepare to strike that ball at that new position.

Optionally, the system may provide a detailed automatic analysis covering Tennis game events such as (i) served balls that hit the T point, Wide point or Body point (each serve can be close to the serve line or to the net); and (ii) serves above a certain speed limit. The types of strokes which may be identified by the system may include, for example: (i) first and second serves; (ii) backhand; (iii) forehand, including: inside out and passing shots; (iv) forehand and backhand volley; (v) nets; (vi) first and second return; (vii) smash, etc.

According to some embodiments of the present invention, the system may further provide an automatic analysis by pattern of: (i) different combo; (ii) rally; (iii) data of all points that were gained at second serves; (iv) a tactical pattern e.g. "Serve-Return-Forehand"; (v) player's position (The position may be presented in a color map) (vi) serve and run; and (vii) rallies above a certain amount of strokes.

According to some embodiments of the present invention, the system may further provide an automatic analysis by score. For example, (i) keep score (ii) analysis according to specific score in a game; (iii) ending score in a session; (iv) big points; (v) outs and nets; and (vi) leading and behind states, say by deriving scoring for different events, from rules of the game as encoded in modules of an exemplary system of the present invention, as described in further detail hereinbelow.

According to some embodiments of the present invention, the automatic analysis may be performed by identifying and classifying events of an entire RT sport session, say a real Tennis match. Further, the analysis may result in an online edited video version of the RT sport session. Additionally, a user may be enabled to perform debriefing and analysis operation by selecting to review specific events by their type according to the event log—i.e. by jumping from one part of the video to the other, as described in further detail hereinabove.

According to some embodiments of the present invention, an access to all events of the same type may be achieved via: (i) a clip with a sequence of all events from the same type, or (ii) an abridged video which utilizes events' log file, where a user may jump between events of the same type. Each event in the event log file may include indication of a start point of an event and an end point of the event. Skipping between events may be enabled to the user based on automatic classification and tagging of beginning and end of each event. Each event may be associated to data including a type name according to classification of the event, a time tag, one or more players that are associated to the event and an event result.

According to some embodiments of the present invention, there is provided an immediate feedback process which does not require pre or post game manual processing for breaking of a session into classified events. The automatic event classification process allows a player and a coach to watch the events and debrief only the events of interest. Additionally, such a feedback provides an efficient and focused training process.

According to some embodiments of the present invention, the debriefing is performed via a visualization and feedback dashboard which provide the user with: game's statistics, events' analysis, game' video, event log data, 3D animated virtual dynamic scenes which show three dimensional (3D) graphics display, based on the player's location and stroke classification, including the ball's and players' movement during the game, etc.

According to some embodiments of the present invention, an automatic analysis of video sequences of an entire match (i.e. sport game) or selected parts thereof (say strategy and key points) is provided herein. The analysis is also performed to present a combined biomechanical and 3D tactical analysis, in a synchronized video and 3D virtual scenery display. Biomechanics aspects of the match may include, for example, movement analysis of the player, for improving the player's action behavior such as hand movement during strokes, etc.

According to some embodiments of the present invention, data collection may be achieved in a non-intrusive manner. It does not interfere with the game's action and it does not require the player wearing a sensor during a match (i.e. real sport game) or training. In the 3D virtual dynamic scenes the player and ball position, the players' footwork, the ball's trail and hit point on the ground are displayed. The 3D virtual dynamic scenes may be presented and displayed various viewing modes: top view, side view, from the ball's point of view and from the player's point of view. The 3D virtual dynamic scenes may be displayed from the point of view of the opponent player.

Optionally, the system may create an attributed profile of the object (say a player or ball), based on at least one pattern of tactical behavior. The attributed profile may include performance data such as speed of ball strokes, results' statistics, and motion pattern across the court etc. The system may enable a real-time upload of (i) the stored position; and (ii) the identified motion.

Optionally, utilizing cloud computing services or any other technology, data uploaded by a system of one of the present examples, may be accessible from any place via the Internet, using any type of computer device such as a laptop computer, a tablet computer, a smart phone, and the like. Players and coaches are thus able to conduct remote debriefing and to provide remote guidance in RT. In other words, virtual coaching may be provided.

Optionally and additionally, the system may perform a combined and synchronized biomechanical analysis and 3D tactical analysis of: (i) full game; (ii) strategy e.g. number of hits, type of stroke, location of hits and the like; (iii) score; and (iv) match scoring patterns such as big points. The biomechanical analysis may be performed by combining (i) a type or strength of stroke; (ii) type of motion or location of the tennis player in the court; and (iii) type of behavioral pattern according to match scoring patterns.

Optionally and additionally, embodiments of the present invention may provide a system that may perform, without an operator, a preliminary setup or corrections during the event, the following actions: (i) automatic calibration of cameras by identifying field boundaries and automatically re-align the cameras' direction, tilt angle, etc.; (ii) automatic customization of light in the stream of video, according to: (a) day and night lighting; and (b) weather conditions; (iii) automatic reduction of vibration in the stream of video; (iv) automatic identification of a start of the real sport game; (v) automatic identification of an end of set; and (vi) automatic identification of an end of the real sport game. In one example, the system identifies a change in lighting conditions (say when the sun comes out of a cloud), by slow background comparison among video frames and fast background comparison among video frames. The system may utilize at least one computer device.

According to some embodiments of the present invention, there is provided an automatic procedure of uploading of debriefing data to an internet page of a player, and sharing performance of the player by providing access to the debriefing data from any location via the Internet or any wireless network by laptops, tablets, smart phones etc. Further, remote debriefing may be available to players and coaches, thus offering guidance in RT.

Furthermore, a dynamic updated database and a social network of athletes and sport players may create a platform for sport players to share data with their coach, friends and family. The database may include for example, clips of special events and statistics. Also, the database may be used as a scouting tool for scouts, coaches and players.

According to some embodiments of the present invention, the smart-court system is implemented in multiple courts and all smart-court systems of those courts are connected to one or more social networks and players' databases.

Moreover, embodiments of the present invention provide a system that enables automatic profile generation according to performance of a Tennis player during a game or during a series of games. The profile of the Tennis player that was generated may be used for: (i) scouting for new talents; and (ii) finding a partner according to specified parameters. A social network of tennis players may be generated to allow sharing data with other players, a coach, friends and family via clips; special events and statistics e.g. speed of ball. Also, the system may be used as a learning tool for players. Optionally, the system sends automatic notifications to scouts and to coaches, through the social network, according to update of players' performance parameters.

The generated profile of the real player may be published in the social network of tennis players. Talent scouting may be performed by utilizing the published profile as well as partner matching. For example, a real player that is aware of her or his Tennis techniques that require improvement may search a partner that possesses a higher level in these specific Tennis techniques.

FIG. 1A is a top 3D perspective view diagram of a system that is incorporated in a Tennis court, according to some embodiments of the invention.

In a non-limiting example, the system may be incorporated in a Tennis court. A real player 110 may be training or competing against a real player 140 with a Tennis ball 120.

According to one aspect of the present invention, four cameras 130 may be utilized to monitor a 3D area within and around a game's court to capture motion and activities of real Tennis players 110 and 140 and of the ball 120. Optionally, the cameras 130 are megapixel cameras. When the system is in use, video pixels captured by each of the cameras in video, are translated by processor 150 into 3D coordinates for identifying the spatial location of the monitored objects (i.e., ball, player, net, etc.). Based on the identified locations, the video data is processed for tracking the movement of the Tennis ball 120 and the real players 110 and 140. The real players are not required to be equipped with an electronic sensing device. When the pixel coordinates are known, automatic zooming on the video is also enabled.

According to some embodiments of the invention, camera calibration may be enabled for each frame. The court may be divided into grids so only junctions of the grids are being checked. If a deviation is identified in a grid than the frame may be checked for calibration.

According to another aspect of the invention, at least two cameras, preferably four cameras 130 may be automatically calibrated, according to identification of boundaries of the court. The automated calibration may not require an intervention of an operator. The cameras 130 may track the real players 110 and 140 and the Tennis ball 120 in an accurate and reliable manner on any surface.

Further, the stream of multimedia data (i.e. video) that is transmitted from the cameras 130, may be automatically customized without an intervention of an operator, according to: (a) day and night lighting or artificial floodlight; and (b) weather conditions, for example, in windy weather the cameras 130 may wobble and the multimedia data that is transmitted might need to be fixed; and (c) shadow covering parts or most of the court. The system may also, automatically reduce vibration in the stream of video, say through known in the art techniques.

According to some embodiments of the invention, a start and an end of a real sport game or real training may be automatically identified by the system (say by tracking the players as they come or leave the court). Furthermore, the system may automatically identify change of game status, and not require an intervention of an operator, by identifying, for example, a predefined gesture of the real players 110 and 140. Optionally, the system may identify change of location of players 110 and 140 when the real players 110 and 140 switch sides on the court. Also, the system may identify a repeated serve.

According to another aspect of the invention, the system may analyze a pattern of behavior of real players 110 and 140 in a video (say a multimedia) stream. The system may perform an automatic analysis, by receiving a stream of a video of the real sport game in RT. Next, the system may identify and tag the position and the motion of the real players 110 and 140 and the ball 120, according to classification rules. The classification rules may be based on tactical behavior pattern analysis of the position and motion of real players 110 and 140, and of the ball 120, say by identification of an unforced error, as described in further detail hereinabove.

Further, the system may enable a review of one or more of the objects' (i) position; (ii) motion; and activity, according to the classification. Furthermore, the system may store one or more tags with information related to classified events and/or patterns of tactical behavior. Information regarding activity of the real players may include: (i) type of stroke; (ii) left or right hand usage; and (iii) strength of stroke.

According to yet another aspect of the invention, the system may provide recommendations to a player on how to correct his or her stroke and/or game management and tactics thus being utilized as a learning tool of techniques and strategies, as described in further detail hereinabove.

According to yet another aspect of the invention, the system's capability to understand the course of the Tennis play based on identifying and classifying events may contribute in cutting out idle time in the video file to save storage space, by cutting out idle time between identified events. A Tennis match video includes long periods of idle time between games' session, where there is not activity of the players which is relevant to the game. The system may identify the idle time and cut it out from the video, hence reducing the size of the video file, saving storage, bandwidth and upload and download resources and cost, etc.

According to yet another aspect of the invention, the system may play an abridged video or virtual 3D dynamic scenes representing the video game sessions, in which the pattern of tactical behavior of the real players 110 and 140 may be presented. The video and the related virtual 3D dynamic scenes may be displayed simultaneously on the same screen, enabling the user to analyze the game both strategically by reviewing the motion across the screen at the virtual 3D dynamic scene version, and analyzing biomechanical motion of part of the body at the video file. The abridged video or virtual 3D dynamic scenes can be played according to a user query for displaying only events of specific type, for example, showing all backhand strokes through the game, through two or more games played by the same player on different days, etc.

In one example, a user query may request all backhand strokes at the front area of the court—either of strokes of a specific Tennis mach or strokes of a number of Tennis matches. Accordingly, a customized video (i.e. clip) may be created by concatenation of video captures of events of specific type, thus enabling a player or a coach to focus in specific type of events. The clip may be uploaded to the social network and be accessed via the internet 180 or be viewed and/or physically received at the court.

According to yet another aspect of the invention, the customized video may be generated by a specified criterion or event. For example, generating a video with all successful backhands in a real sport game or in a series of games. In another example, generating a video of all successful forehands of all champion players from different geographical places.

According to yet another aspect of the invention, the system may create an attribute profile of at least one of the real players 110 and 140 based on at least one pattern of behavior and log of events. The pattern of behavior may further be analyzed to identify a mental event. An example of a mental event that the system may recognize is when a real player is angry (say by automatically identifying in the video streams, that the player smashes his racket in anger). Other mental events that the system may recognize in the video streams may be, for example, a decline in the performance of the players (say a slowing down of the player as evident from continuous measurement of the player's average speed). This decline in performance of the player and/or the player's repeated wiping of sweat from his racket may also be interpreted by the system, as related to a mental event.

According to yet another aspect of the invention, the system is arranged to be an integral part of a Tennis court. Further, the system may be fully adaptable to both indoor and outdoor courts.

According to some embodiments of the present invention the real time analysis of events during the real sport game may be used for enouncing or displaying the game results for the players and the audience that is watching the game via a remote terminal 170 or a smart phone 170. The real time analysis may be transferred via data communication link 180 say over the internet or another wide area network.

Optionally, the data related to the event may be used for supporting line calling decisions of a human umpire or as an objective officiating tool. For example, the tool may provide accessible debriefing and analysis capabilities combined with line-calling, to determine if a ball was inside the court or not, in a Tennis game. Optionally, the streamed data may include, for example: (i) location, speed of the tennis player or a ball and acceleration of a player or a ball; (ii) type or speed of a tennis stroke; (iii) result of success or failure at the game to the player; and (iv) data related to score that were gained in the game in real time. Data about the scoring system is transmitted in real time. For example, type of points that are gained during the real sport game or training.

Figure 1B:
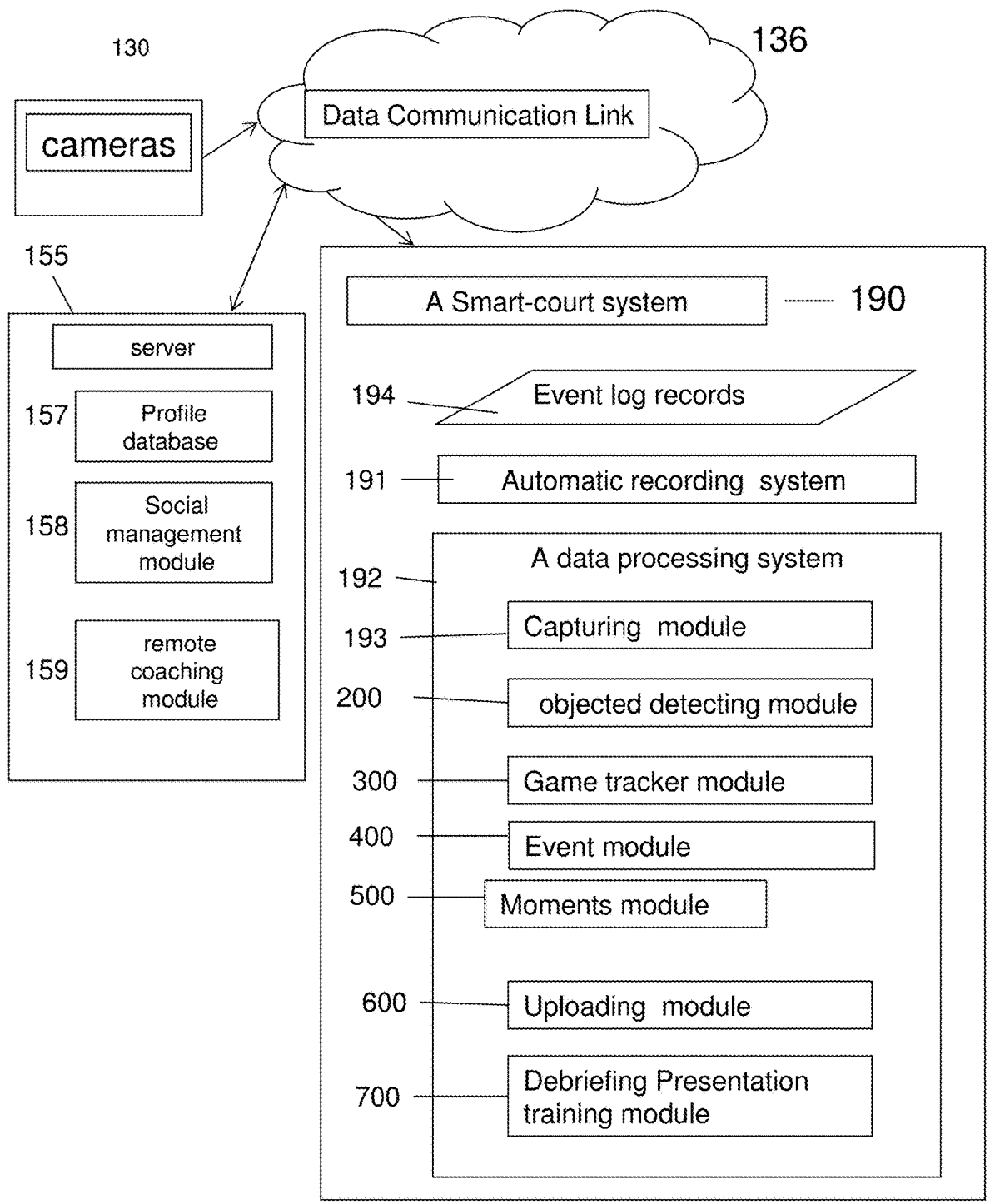
FIG. 1B is a simplified block diagram of a smart-court system, according to some embodiments of the invention.

FIG. 1B is a block diagram of a smart-court system, according to some embodiments of the invention.

According to some embodiments of the invention, a smart-court system 190 may be connected to cameras 130 via a data communication link 136. The smart-court system 190 may be comprised of an automatic recording system 191 which automatically records and analyzes a pattern of tactical behavior and then classifies it, as an event in an event log file 194 and a data processing system 192.

According to some embodiments of the invention, the data processing system 192 may be comprised of the following modules: (i) a capturing module 193 for grabbing the video of the RT sport session and encoding it; (ii) object detection module 200 (described in details in FIG. 2); (iii) a game tracker event 300 for identifying basic events; (iv) an event module 400 for automatically identifying and classifying events based on the tracking and analysis of the motion and the activities of the tracked objects and calculating statistics that occur during the RT sport session; (v) a moments module 500 for creating customized video (see FIG. 5); (vi) an uploading module 600 for uploading profiles and video to the network; and (vii) a debriefing presentation training module 700 for enabling a user to watch the clip with the sequence of events of a same type or to watch the abridged video.

According to some embodiments of the invention, a server 155 may be connected to the smart court system via data communication link 136. The server may be comprised of: (i) a profile database 157; (ii) social management module 158 for managing social activity between the players; and (iii) a remote coaching module 159 enabling coaching by viewing the game video at a remote location.

Figure 2:
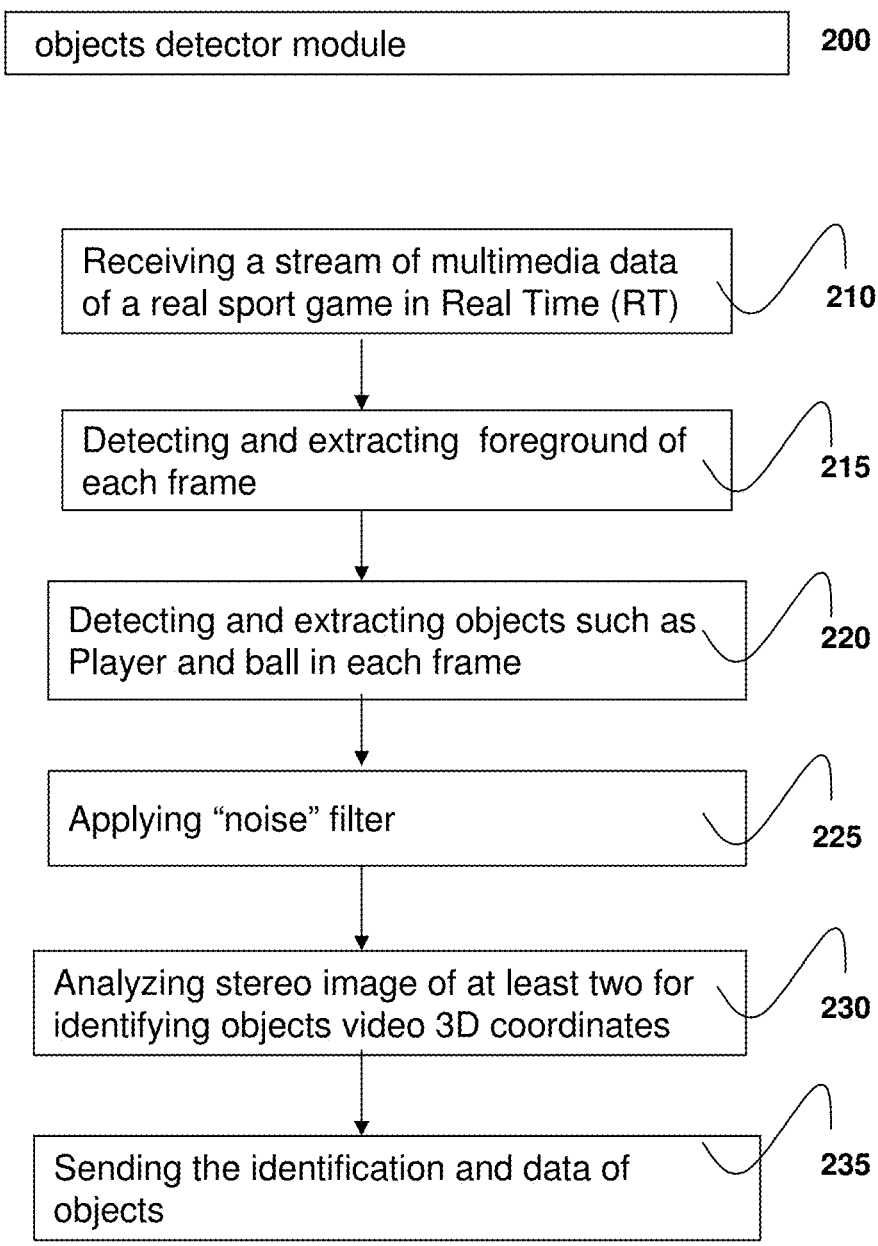
FIG. 2 is a simplified flowchart of objects detecting module, according to some embodiments of the invention.

FIG. 2 is an exemplary simplified flowchart of object detection module 200 activity, according to some embodiments of the invention.

According to an aspect of the present invention, the object detection module 200 may begin with receiving a stream of multimedia data of a real sport game in Real Time (RT) (stage 210) from the capturing module 193. From each frame, objects (such as players and/or a ball) may be automatically extracted from the background, by the object detection module 200. First, foreground of each frame is identified and extracted from the frame image. (stage 215). Optionally, the background of the image can be identified and extracted in some of the frames, as the background of the frame is not supposed to change from frame to frame it may be detected each specified amount of time. Optionally, the object detection module 200 further identifies a change of the background, say when both a slow background comparison among video frames and a fast background comparison among the video frames indicate a change in pixels of the background, as described in further detail hereinabove.

At the next stage, the objects (i.e. players and ball) are detected and extracted from each frame (stage 220). Optionally, a "noise" filter is applied (stage 225) on the frames and identification of the objects video 3D coordinates is performed by analyzing stereo images of at least two cameras (stage 230).

Finally, the identification and data of objects is sent to a tracking module (stage 235).

Figure 3:
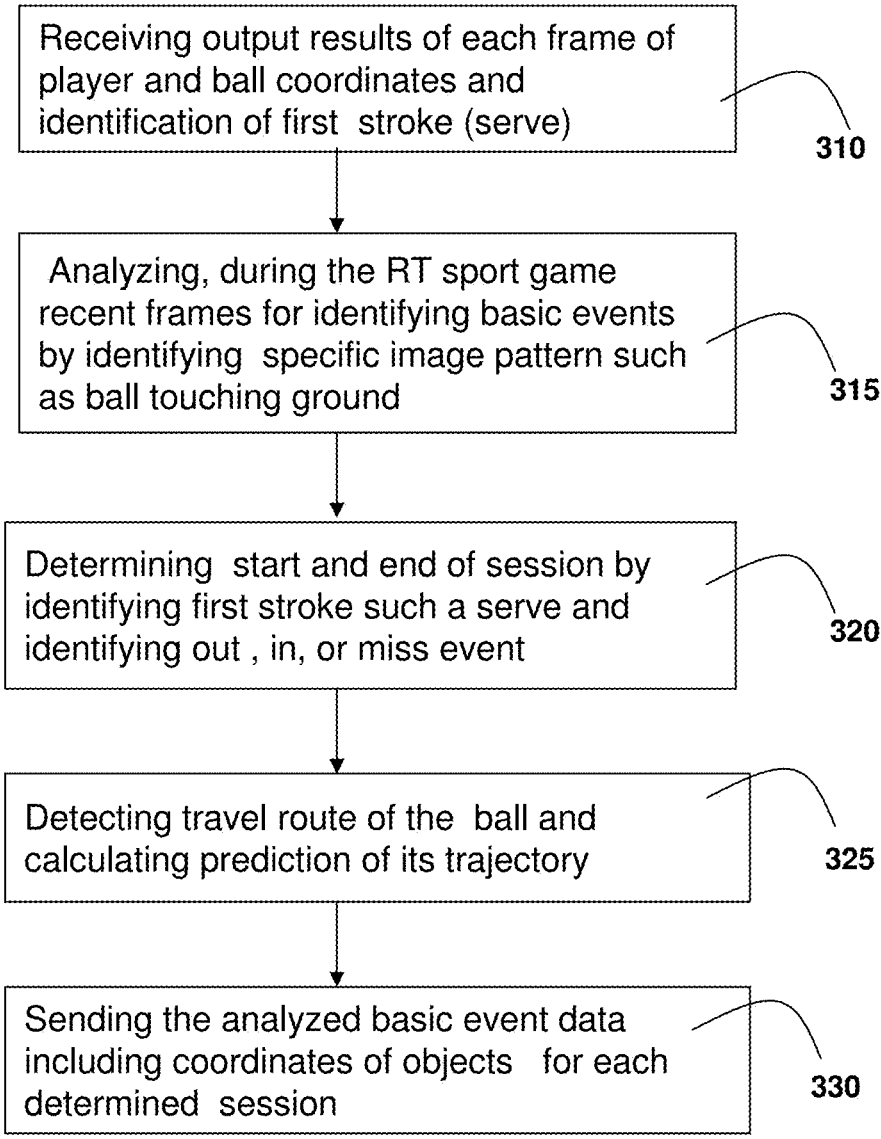
FIG. 3 is a simplified flowchart illustrating activity of game tracker module, according to some embodiments of the invention.

FIG. 3 is a flowchart diagram illustrating system activity of game tracker module 300, according to some embodiments of the invention. The game tracker module 300 analyses frames to yield basic events such as a stroke or a serve for the purpose of identifying a session. For example, identifying when a player strikes a ball before the ball touches the ground. Additionally, the game tracker module 300 may also identify when the ball hits the net or when the ball falls out of the lines or when a user doesn't respond to a ball that falls on the lines.

According to some embodiments of the invention, game tracker module 300 may begin with receiving output results of each frame of player and ball coordinates and identification of first stroke (serve) (stage 310). The game video recent frames are analyzed, during the RT sport game for identifying basic events by identifying specific image pattern such as a ball touching ground stroke (stage 315) to determine start and end of session by identifying first a stroke such a serve and identifying "out", "in", or "miss" event (stage 320).

Optionally, the travel route of the ball is detected and a prediction of its trajectory is calculated (stage 325).

At the end of each detected session, the analyzed basic event data including coordinates of objects for each determined session of detected basic events is conveyed to an event module (stage 330).

Figure 4:
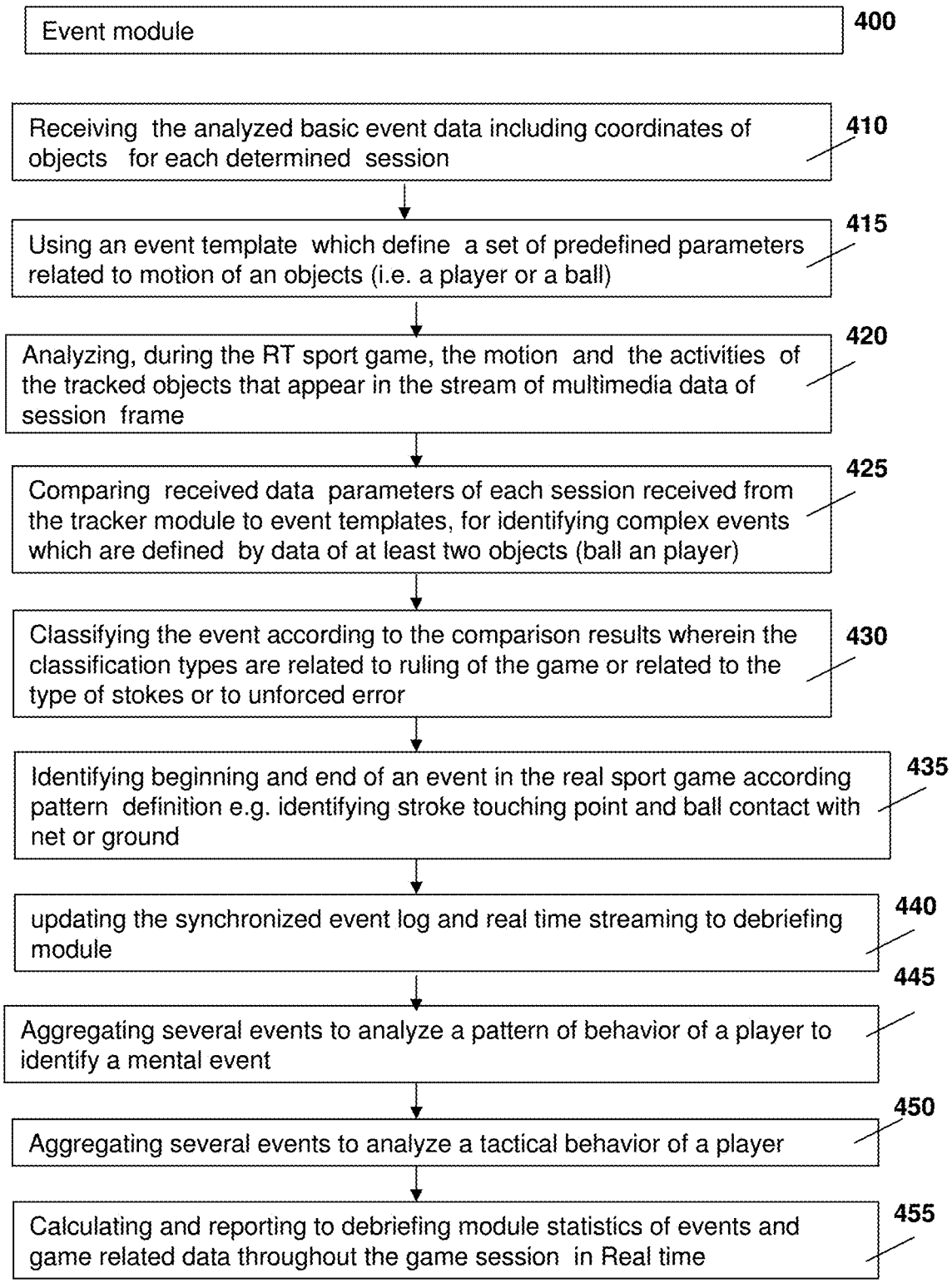
FIG. 4 is a simplified flowchart illustrating activity of event module, according to some embodiments of the invention.

FIG. 4 is a flowchart diagram illustrating activity of event module 400, according to some embodiments of the invention. The event module 400 may yield and classify basic and complex events out of analysis of several frames. For example, types of strokes and unforced errors. First, the analyzed basic event data including coordinates of objects for each determined session of a game is received from the tracking module 300.

According to some embodiments of the invention, event module 400 may use 410 event templates which define a conditions usable for identifying basic events based on an analysis of a motion of objects (i.e. a player or a ball), say that a certain movement between a ball and a player or a racket is indicative of a serve (stage 415). The event templates may be implemented as a set of rules encoded in the event module 400 (i.e. as a part of a computer program's code) itself, or be stored in a table of a predefined format, in use by the event module 400, say in a natural language format, as known in the art.

The position, motion, and activities of the tracked objects that appear in the stream of multimedia data of each frame are analyzed during the RT sport game (stage 420).

The received data parameters of each session received from the tracker module and the motion and activity analysis are compared to the event templates, for identifying basic and complex events in near real time. (stage 425).

Based on the comparison results, the events are classified, wherein the classification types are related to ruling of the game or related to the type of stokes or to unforced error (stage 430).

For each event, the timing of beginning and end are estimated and a synchronized log of the event is generated (stages 435, 440), according to pattern definitions (e.g. identifying stroke touching point and ball contact with the net or ground). Optionally, aggregating several events to identify a complex event such as a pattern of behavior of a player, a mental event (stage 445), or a tactical behavior of a player (stage 450) (say an unforced error).

Optionally, the event module 400 calculates and reports statistics of events and game related data throughout the game session (stage 455).

Figure 5:
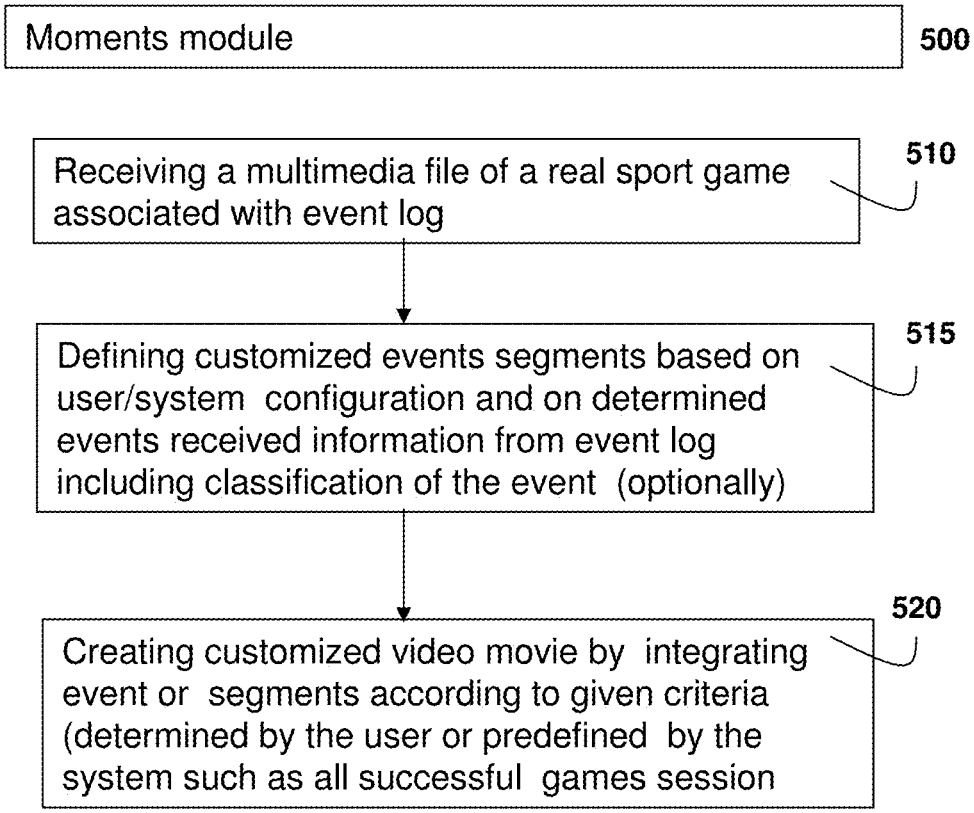
FIG. 5 is a simplified flowchart illustrating activity of moments module, according to some embodiments of the invention.

FIG. 5 is a flowchart diagram of Moments module 500, according to some embodiments of the invention.

According to some embodiments of the invention, a user may be enabled to configure preference of beginning and ending of an event. For example, one user may configure a beginning of backhand event when the player is moving her or his hand and another user may configure beginning of backhand event when the ball leaves the racket of the player.

The moments modules 500 receives the multimedia file of a real sport game associated with the event log (stage 510). Optionally, the moments module 500 enables to define customized events segments based on user/system configuration and on determined events received information from the event log including classification of the events (stage 515).

The module enables to create customized video movie by concatenating vido sequences of events according to given criteria which may be determined by the user or predefined by the system, such criteria may include selecting successful games session, fasted ball strikes, etc. (stage 520).

Figure 6:
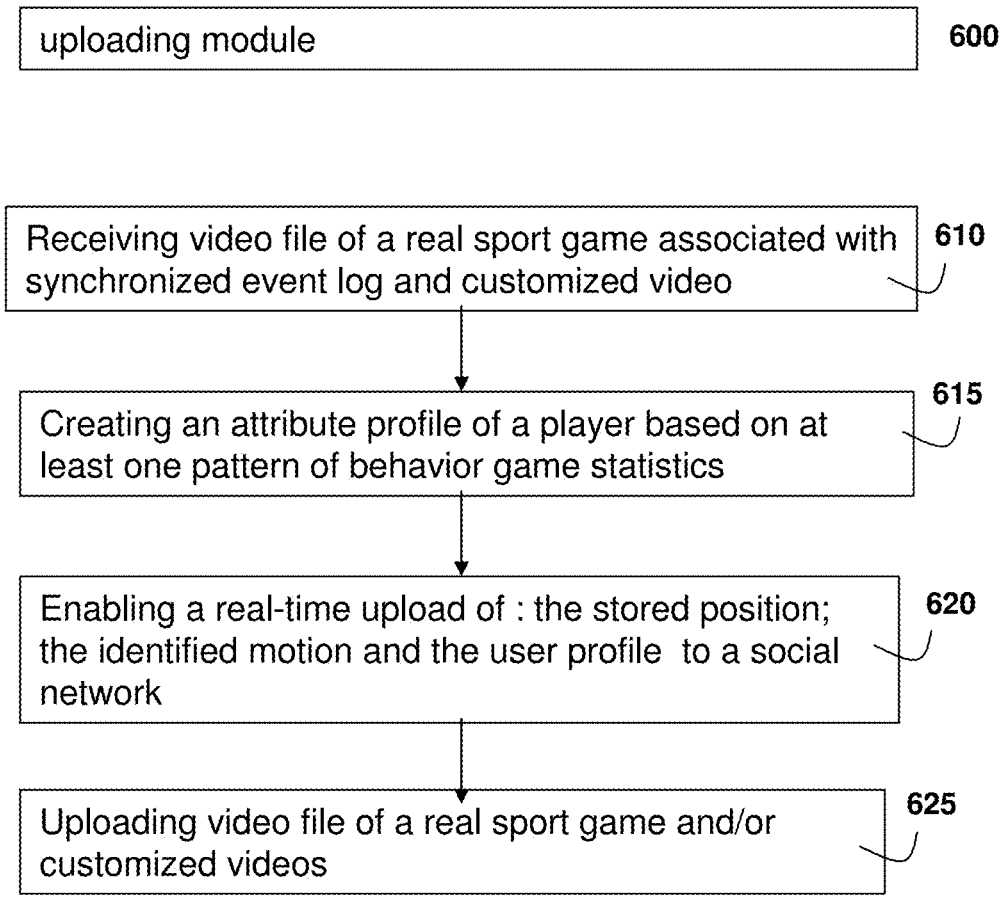
FIG. 6 is a simplified flowchart illustrating activity of upload module, according to some embodiments of the invention.

FIG. 6 is a flowchart diagram illustrating an uploading module 600, according to some embodiments of the invention.

According to an aspect of the present invention, after the real sport game is over, the following stages are taken: Receiving video file of a real sport game associated with synchronized event log file (stage 610). Based on the video and synchronized event log file, there is created an attribute profile of an object (say a player) based on an analysis of the event log, the analysis yielding at least one pattern of behavior to be published in a social network (stage 615). The uploading module 600 may further enable a real-time upload of: the user profile, video file of a real sport game and/or customized videos to a social network (stages 620, 625).

Figure 7:
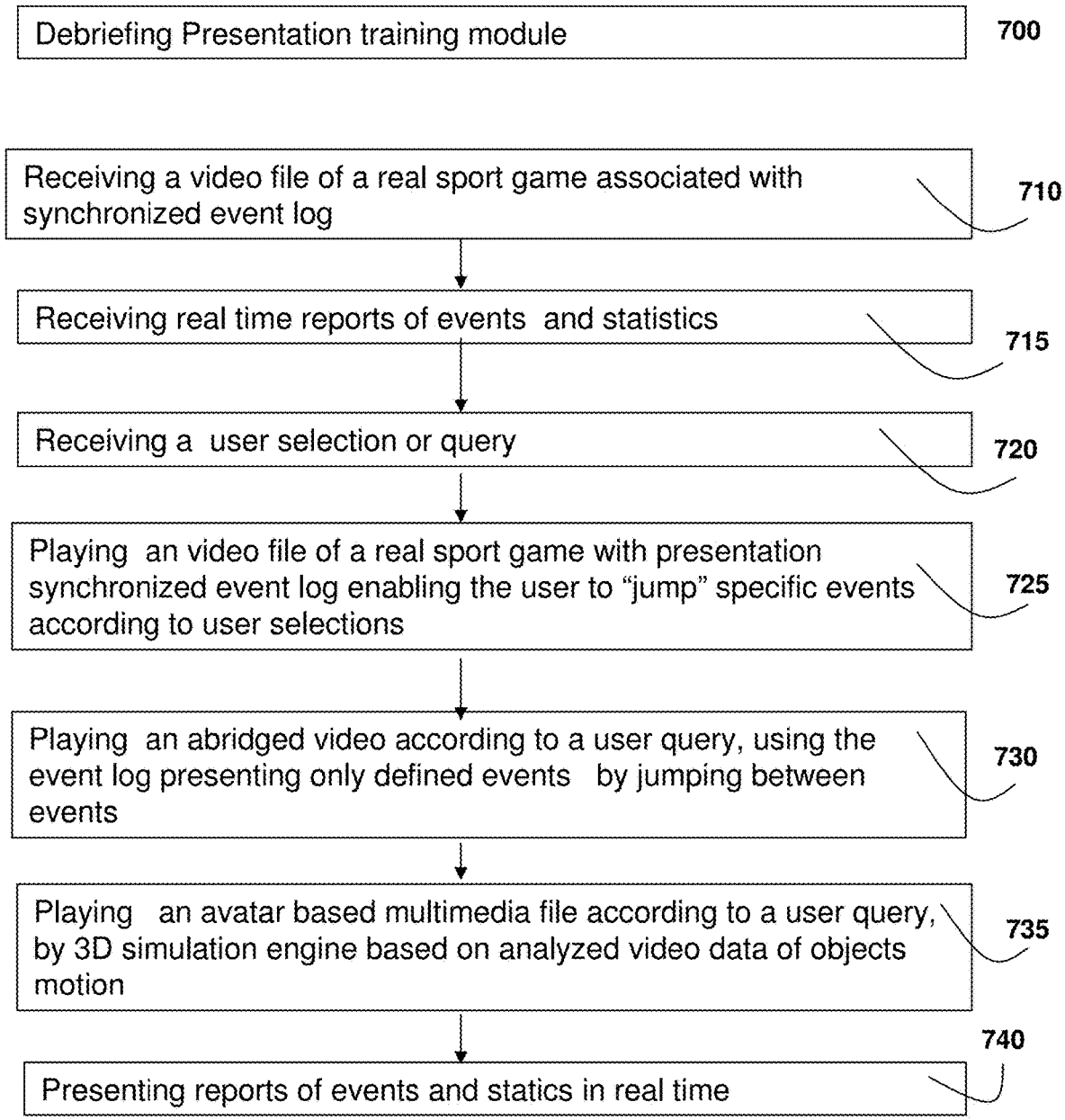
FIG. 7 is a simplified flowchart illustrating activity of Debriefing presentation training module, according to some embodiments of the invention.

FIG. 7 is a flowchart diagram illustrating activity of debriefing presentation training module 700, according to some embodiments of the invention.

First the debriefing presentation training module 700 receives 710 a video file of a real sport game associated with a synchronized event log.

During the game, in real time, events and statistics are received (715) from the tracking module 300 or the event module 400.

According to an aspect of the present invention, the debriefing presentation training module 700 further receives a query from a user (720).

Optionally, the module plays a video file of a real sport game with the synchronized event log enabling the user to jump between specific events according to user selections (stage 725).

Using the event log, an abridged video may be played per a user query, by jumping between requested events. Optionally, the abridged video presents only portions of the video, which include events related to the user query, such as strokes at the rear part of the court (730). Throughout the presentation of the abridged video, the user may jump from one marked event to the other, using a list of events, based on the event log. According to a user query based on analyzed video data of objects motion, a virtual 3D dynamic scenes animated video clip may be played. The animated video clip is generated online or in real-time, using 3D engine which simulates players and ball motion (step 735). Optionally, the module presents reports of events and statistics in real time by voice or by textual titles appearing on the video (stage 740).

According to further embodiments of the present invention, the system comprises a pointing device (160, see FIG. 1) enabling to mark positions on the field ground for the purpose of indicating the position of the virtual opponent. The pointing device is controlled by a designated controller module, based on simulation of the opponent virtual player and/or predefined training programs. According to an optional embodiment, the pointing device can be a laser based device enabling to use a laser beam that continuously marks the location of the virtual opponent on the tennis court ground. According to another option the virtual opponent is indicated by a hologram.

According to yet another aspect of the invention, the system may include at least one tennis ball machine for projecting balls in a court for training purposes. The ball machine may be programmed to utilize the video game analysis for identifying player behavior and activate the ball machine for effective training of the player.

According to some embodiments of the present invention, the pattern analysis of the players' image can indicate on physical characteristics of the player such as the player's weight and calories that were lost throughout the game.

According to an aspect of the invention, tracking, identifying and capturing the motion of players and objects such as balls and rackets may be performed utilizing one or more of the following elements: (i) RT methods; (ii) smart cameras; (iii) image processing and patterns recognition; (iv) 3D objects localization and tracking; (v) human behavior modeling; (vi) 3D visualization (vii) video compression; (viii) web cloud platform, etc.

Further, a system according to the presented examples, may provide: (i) a RT ball speed detection; (ii) an audio feedback, such as announcing game score or ball velocity; (iii) score measurement; (iv) in and out calculations; and (v) an immediate video playback.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

What is claimed is:

1. A computer implemented method of video based sport activity analysis, the method comprising the steps of:
   a) receiving at least one video stream of a sport session captured in the at least one video stream using at least one video camera;
   b) automatically tracking motion of at least one object using the video stream;
   c) based on the tracked motion, automatically identifying occurrence of a sequence of basic events captured in the video stream;
   d) automatically identifying a complex event that is based on the identified basic events of the sequence;
   e) automatically generating a log synchronizing between at least two of the identified events and the video stream; and
   f) selecting and playing at least one part of the video stream to a user, each one of the selected parts showing a respective one of the identified events as captured in the video stream, the part being selected from the video stream using the log.

2. The method of claim 1, further comprising allowing user selection of at least one of the events synchronized with the video stream by the log, wherein said selecting of the at least one part of the video stream is further based on the user selection.

3. The method of claim 1, further comprising allowing a user to input a query defining a user selection of at least one of the events synchronized with the video stream by the log, wherein said selecting of the at least one part of the video stream is further based on the query input by the user.

4. The method of claim 1, further comprising allowing user selection of at least one of the events synchronized with the video stream by the log, by event type, wherein said selecting of the at least one part of the video stream is further based on the user selection.

5. The method of claim 1, further comprising presenting a recommendation to the user upon playing of at least one of the selected parts, the recommendation being selected according to a type of the event shown in the part.

6. The method of claim 1, further comprising combining the selected parts into a single video sequence, thereby generating an abridged version of the video stream.

7. The method of claim 1, further comprising combining the selected parts into a single video sequence according to a criterion predefined by the user, thereby generating an abridged version of the video stream.

8. The method of claim 1, further comprising cutting video sequences in between the selected parts from the video stream.

9. The method of claim 1, further comprising identifying a mental event based on the tracked motion and on a predefined criterion.

10. The method of claim 1, further comprising capturing at least two of the video streams simultaneously using at least two video cameras, each video camera simultaneously capturing the sport session in a respective one of the video streams, wherein said tracking is further based on three dimensional (3D) analysis of the simultaneously captured video streams.

11. The method of claim 1, further comprising identifying a Tennis Unforced Error event based on the tracked motion and on a predefined criterion.

12. The method of claim 1, further comprising identifying a Tennis Forced Error event based on the tracked motion and on a predefined criterion.

13. The method of claim 1, further comprising generating an animated video clip based on the tracked motion and playing the animated video clip in sync with said playing of the selected parts, on a screen, using the event log.

14. The method of claim 1, further comprising presenting a list of at least some of the events synchronized with the video stream by the log in sync with said playing of the selected parts, on a screen, using the log synchronizing between at least two of the identified events and the video stream, while allowing the user to jump between two of the played parts by selecting among the events in the list being presented.

15. The method of claim 1, further comprising generating an object profile based at least on the tracked motion.

16. The method of claim 1, further comprising generating a player profile based at least on the tracked motion.

17. The method of claim 1, further comprising generating a plurality of player profiles based at least on the tracked motion, and matching between players using the generated player profiles.

18. The method of claim 1, further comprising generating a player profile based at least on the tracked motion and uploading the generated profile to a social network website.

19. The method of claim 1, further comprising automatically identifying a change in a game status based on the tracked movement.

20. A system for video based sport activity analysis, the system comprising:
    a data processing system in communication with at least one video recording system that is being used for capturing a sport session in at least one video stream using at least one video camera, the data processing system comprising a computer programmed to:
    a) receive the at least one video stream from the video recording system;
    b) automatically track motion of at least one object using the video stream;
    c) based on the tracked motion, automatically identify occurrence of a sequence of basic events captured in the video stream;
    d) automatically identify a complex event that is based on the identified basic events of the sequence;
    e) automatically generate a log synchronizing between at least two of the identified events and the video stream; and
    f) select and play at least one part of the video stream to a user, each one of the selected parts showing a respective one of the identified events as captured in the video stream, the part being selected from the video stream using the log.

\* \* \* \* \*